United States Patent
Basra et al.

(10) Patent No.: US 10,547,669 B2
(45) Date of Patent: Jan. 28, 2020

(54) AUTOMATED CONTENT DELIVERY FOR OFFLINE CONSUMPTION

(71) Applicant: Verizon Patent and Licensing Inc., Arlington, VA (US)

(72) Inventors: Arvind Basra, Glen Ridge, NJ (US); Kevin Lisewski, Ramsey, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 106 days.

(21) Appl. No.: 15/676,347

(22) Filed: Aug. 14, 2017

(65) Prior Publication Data

US 2019/0052700 A1 Feb. 14, 2019

(51) Int. Cl.
*H04L 29/08* (2006.01)
*H04L 12/18* (2006.01)

(52) U.S. Cl.
CPC ............ *H04L 67/10* (2013.01); *H04L 12/18* (2013.01); *H04L 67/06* (2013.01); *H04L 67/2842* (2013.01)

(58) Field of Classification Search
CPC ..... H04L 67/10; H04L 67/06; H04L 67/2842; H04L 12/18

USPC ...................................................... 709/217
See application file for complete search history.

(56) References Cited

U.S. PATENT DOCUMENTS

| | | | |
|---|---|---|---|
| 9,112,943 B1 * | 8/2015 | Vulkan | H04N 21/8352 |
| 9,660,967 B1 * | 5/2017 | Paris | H04L 65/60 |
| 2014/0137161 A1 * | 5/2014 | Park | H04N 21/2221 725/62 |
| 2015/0289231 A1 * | 10/2015 | Basra | H04W 72/1242 370/312 |
| 2018/0152807 A1 * | 5/2018 | Van Phan | H04W 4/02 |

* cited by examiner

*Primary Examiner* — Kristie D Shingles

(57) ABSTRACT

A device can receive a request to provide content to a set of devices in a service area. The request can include a set of content configuration parameters associated with the content. The device can obtain the content by using the set of content configuration parameters to search a content source. The device can separate the content into a set of content segments using a content configuration parameter of the set of content configuration parameters. The device can provide multicast session instructions to a multicast system to cause the multicast system to provide the set of content segments to the service area using a multicast session. The multicast session can be used by the set of devices to store one or more content segments of the set of content segments.

20 Claims, 9 Drawing Sheets

AUTOMATED CONTENT DELIVERY FOR OFFLINE CONSUMPTION

BACKGROUND

In computing, a cache is a component that stores data to allow subsequent requests for that data to be serviced faster. Content can be cached using a unicast service that transmits content multiple times by using a unicast session for each unique destination address. Additionally, or alternatively, content can be cached using a multicast service that allows content to be sent once and received by multiple end users by using a multicast session.

DETAILED DESCRIPTION OF PREFERRED EMBODIMENTS

The following detailed description of example implementations refers to the accompanying drawings. The same reference numbers in different drawings can identify the same or similar elements.

A business can deploy a set of user devices on-site to allow on-site customers to access content. However, streaming content via a wireless network can be difficult as each user device can compete for or share in a limited amount of available bandwidth. Additionally, satellite services can be costly and might not reach particular service areas. Additionally, using a unicast service to provide content to each user device can be ineffective as each user device would require a separate download session. Additionally, using an on-site content server can be expensive and difficult to maintain.

Some implementations described herein provide a caching management system to orchestrate delivery of content to a set of user devices for offline consumption. For example, the caching management system can obtain content from one or more content sources. In this case, the caching management system can transcode, encrypt, and/or segment the content. Additionally, the caching management system can schedule the delivery of the content to cause a multicast system to transmit the content to a service area that is accessible by the set of user devices. Furthermore, the caching management system can monitor data use of the set of user devices to be able to modify the content to account for user preferences.

In this way, the caching management system orchestrates automated delivery of content to a set of user devices. By automatically delivering content for offline consumption, the caching management system conserves network resources. For example, the caching management system conserves network resources that might otherwise be used to stream the content via a wireless network or satellite, conserves network resources that might otherwise be used by devices of the customers (e.g., a mobile device of a customer that is using a wireless network of the business), and/or the like.

FIGS. 1A-1F are diagrams of an overview of an example implementation 100 described herein. As shown in FIGS. 1A-1F, example implementation 100 can include a caching management system that orchestrates delivery of content to a set of user devices to provide offline access to the content. Specifically, as provided as an example, FIGS. 1A-1F show the caching management system orchestrating delivery of media content to a set of user devices (e.g., tablets) within golf carts to provide golfers with offline access to the media content.

Figure 1A:
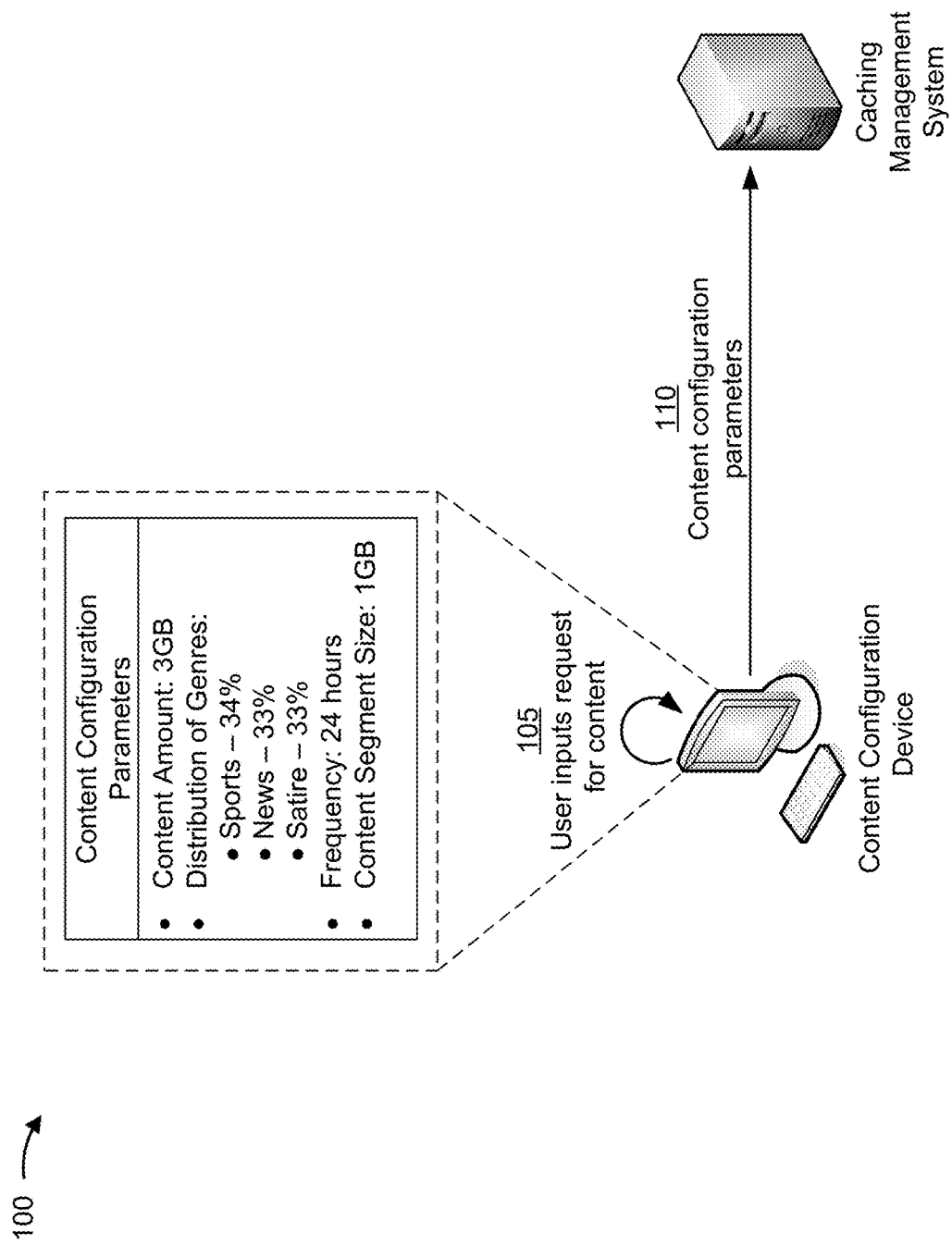
FIGS. 1A-1F are diagrams of an overview of an example implementation described herein.

As shown in FIG. 1A, and by reference number 105, a user can input a request for content. For example, a user can interact with a user interface of a content configuration device to input a request for content that includes a set of content configuration parameters indicating requirements for the requested content. For example, the set of configuration parameters can include a parameter indicating an amount of content (e.g., a total amount of content, an amount of content per genre, etc.), a parameter indicating a frequency at which to provide content, a parameter indicating a content segment size (e.g., as described herein, content can be logically separated into content segments), and/or the like.

Shown as an example, the user can input a request for 3 gigabytes (GB) of content every 24 hours, where 34% of the content is sports content, 33% of the content is news content, and 33% of the content is satirical content. As shown by reference number 110, the caching management system can receive the set of content configuration parameters from the content configuration device.

In this way, the caching management system can receive a set of content configuration parameters that can be used to obtain content.

Figure 1B:
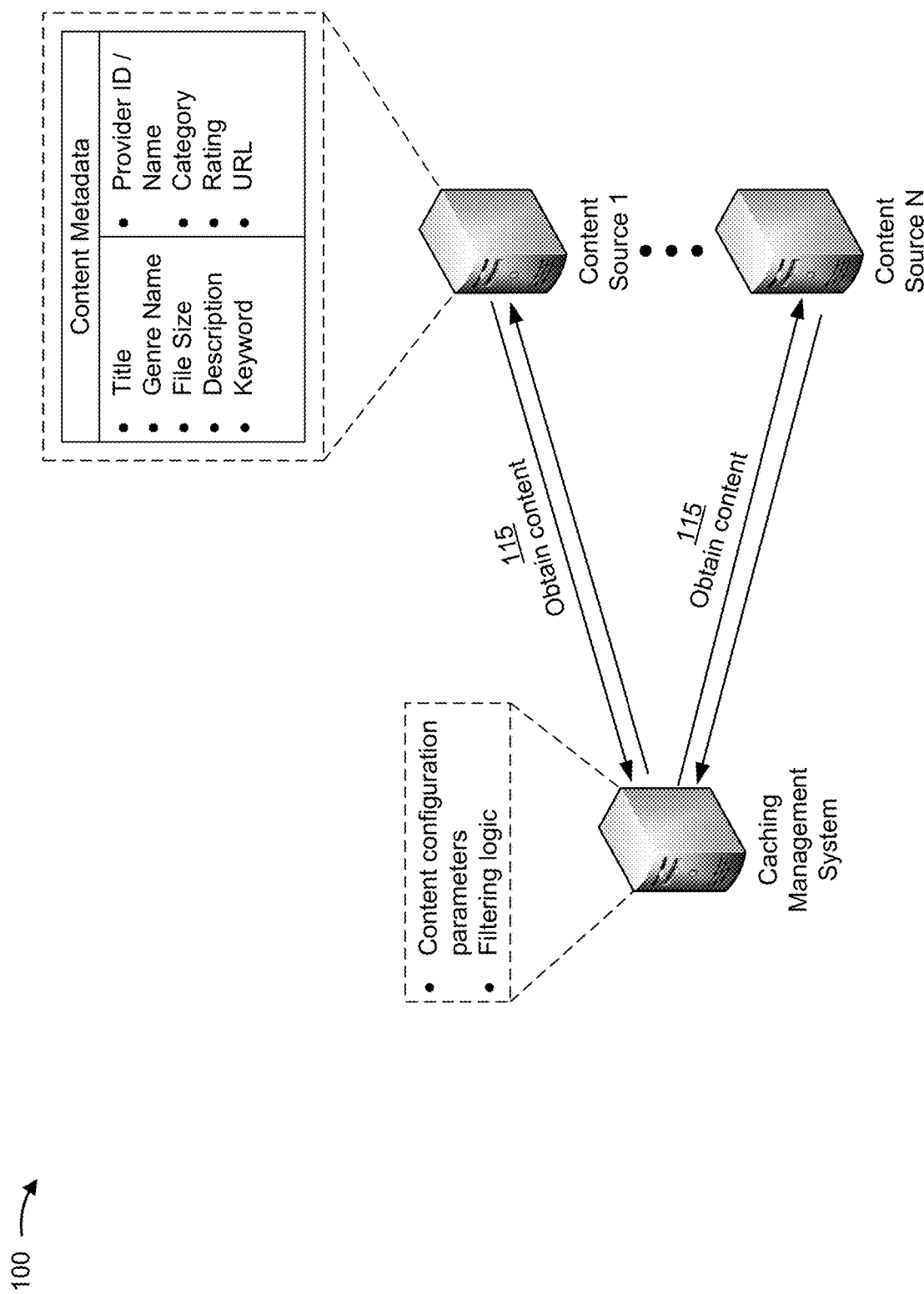

As shown in FIG. 1B, and by reference number 115, the caching management system can obtain content from a set of content sources (shown as content source 1 through content source N). For example, the caching management system can use a filtering technique and one or more content configuration parameters to obtain content from the set of content sources.

As an example, assume content configuration parameters include a parameter indicating a total amount of content of 3 GB, and a parameter indicating an amount of content per genre or a distribution of content genres (e.g., 34% sports, 33% news, and 33% satire). In this case, the caching management system can use a filtering technique to analyze content metadata (e.g., metadata indicating a title, a genre, a file size, etc.) to obtain 1,002 megabytes (MB) of sports content, 999 MB of news content, and 999 MB of satire content.

In this way, the caching management system can obtain content that can be delivered to a set of user devices for offline consumption.

Figure 1C:
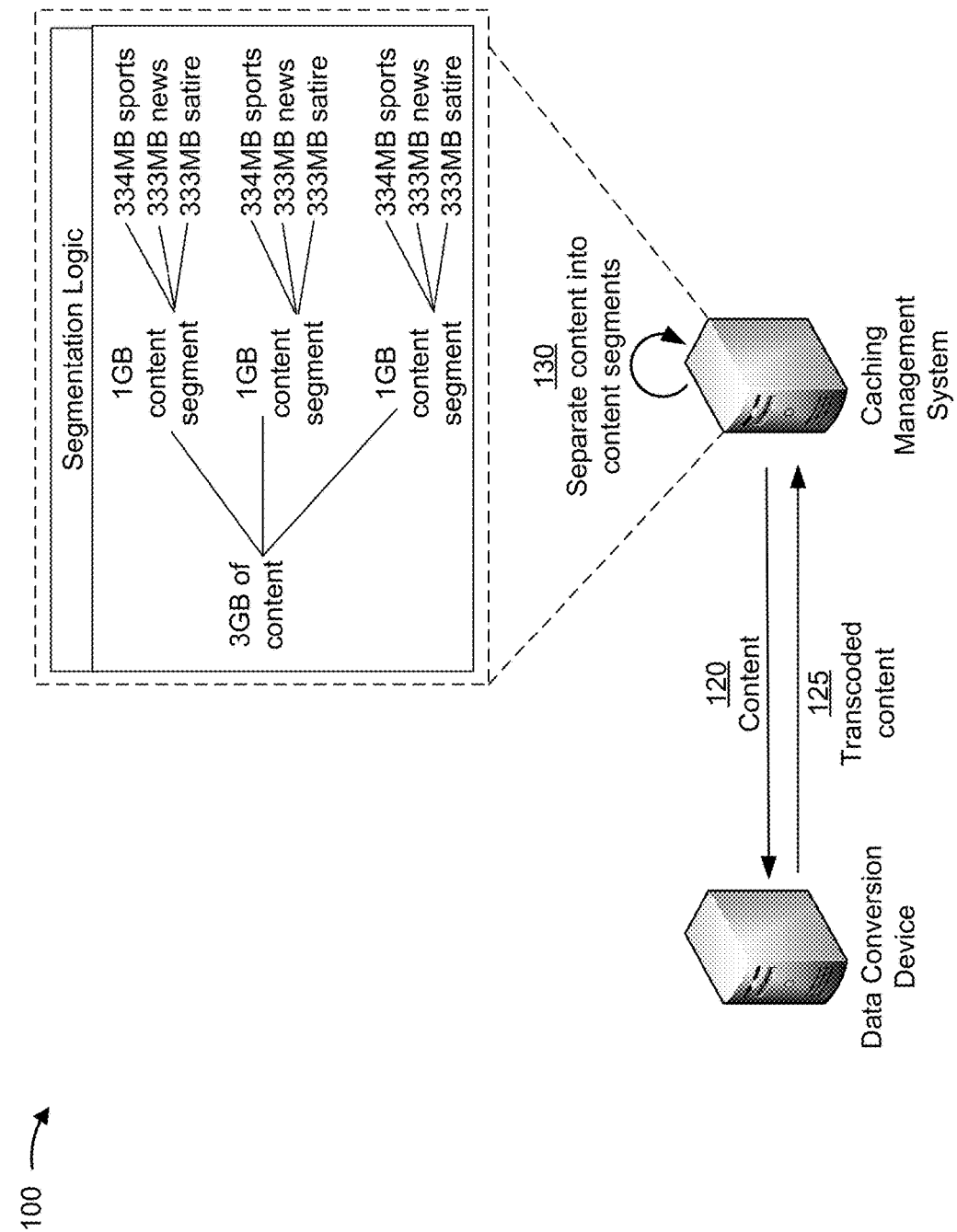

As shown in FIG. 1C, and by reference number 120, the caching management system can provide the content to a data conversion device. For example, the caching management system can receive content that is unable to be cached or that is difficult to cache (e.g., a media file with a hypertext transfer protocol (HTTP) live streaming (HLS) file type). In this case, the caching management system can provide the content to the data conversion device to allow the data conversion device to convert (e.g., transcode) the content to a format capable of being cached (e.g., an mp4 file type). As shown by reference number 120, the data conversion device can provide the transcoded content to the caching management system. In some cases, the caching management system can convert (e.g., transcode) the content, which would reduce use of network resources relative to providing the content to the data conversion device for conversion.

As shown by reference number 130, the caching management system can separate the content into a set of content segments. For example, the caching management system can identify the parameter indicating the content segment size and the parameter indicating an amount of content per genre, and can analyze content metadata (e.g., a genre metadata tag, a file size metadata tag, etc.) to separate the content into content segments that each includes a complete distribution of genres indicated by the content configuration parameters. In this way, a user device that is unable to receive all of the content during a multicast download session can receive one or more content segments that each includes a complete distribution of genres indicated by the content configuration parameters.

Shown as an example, the caching management system can separate the 3 GB of content into three 1 GB content segments. In this case, each 1 GB content segment can include 334 MB of media files relating to sports content, 333 MB of media files relating to news content, and 333 MB of media files relating to satire content.

In this way, the caching management server can use a data conversion device to convert content to a format capable of being cached and can separate the content into content segments to allow user devices to receive subsets of the content during a multicast download session.

Figure 1D:
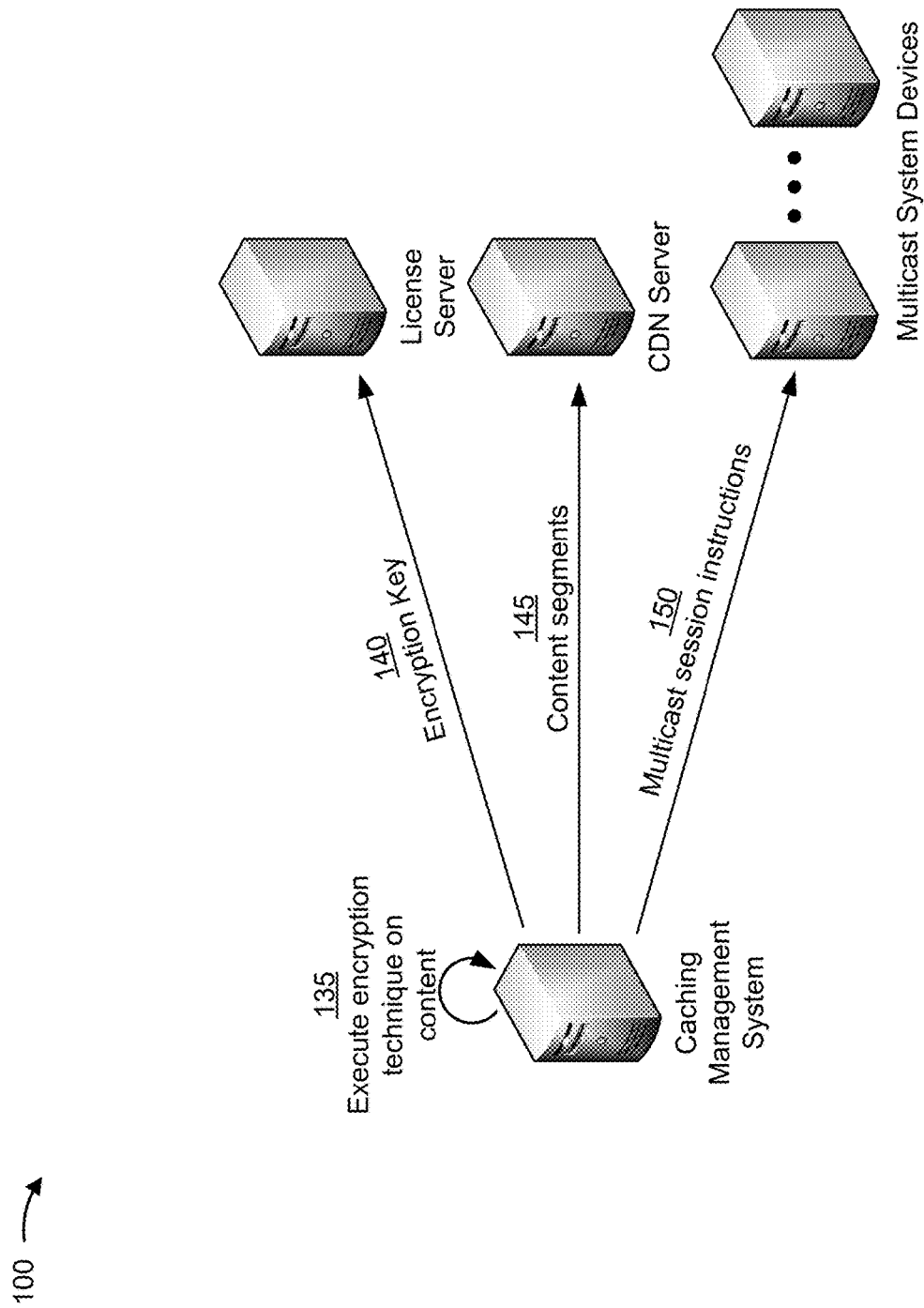

As shown in FIG. 1D, and by reference number 135, the caching management system can execute an encryption technique on the content. For example, the caching management system can execute an encryption technique to encrypt each file associated with the content, compress (e.g., zip) the content with a key (e.g., a decryption key), and, as shown by reference number 140, provide the key to a license server. As described herein, a user device with a license to access the content can interact with the license server to obtain the key to begin offline consumption of the content.

As shown by reference number 145, the caching management system can provide the set of content segments to a content delivery network (CDN) server. For example, the caching management system can provide the set of content segments to the CDN server to allow the set of content segments to be accessible by a multicast system.

As shown by reference number 150, the caching management system can provide multicast session instructions to a multicast system (e.g., shown as a set of multicast system devices). For example, the caching management system can provide multicast session instructions to allow the multicast system to transmit the set of content segments (e.g., the encrypted, compressed content) to a service area accessible by the set of devices. The multicast session instructions can include an instruction indicating a time at which to transmit the set of content segments, a transmission location (e.g., a particular service area, such as a golf course), a location at which the set of content segments are stored (e.g., a uniform resource locator (URL) associated with a storage location of the CDN server), and/or the like.

In this way, the caching management system is able to encrypt the content and orchestrate transmission of the content (e.g., via a multicast download session) to allow user devices to receive and store the set of content segments.

Figure 1E:
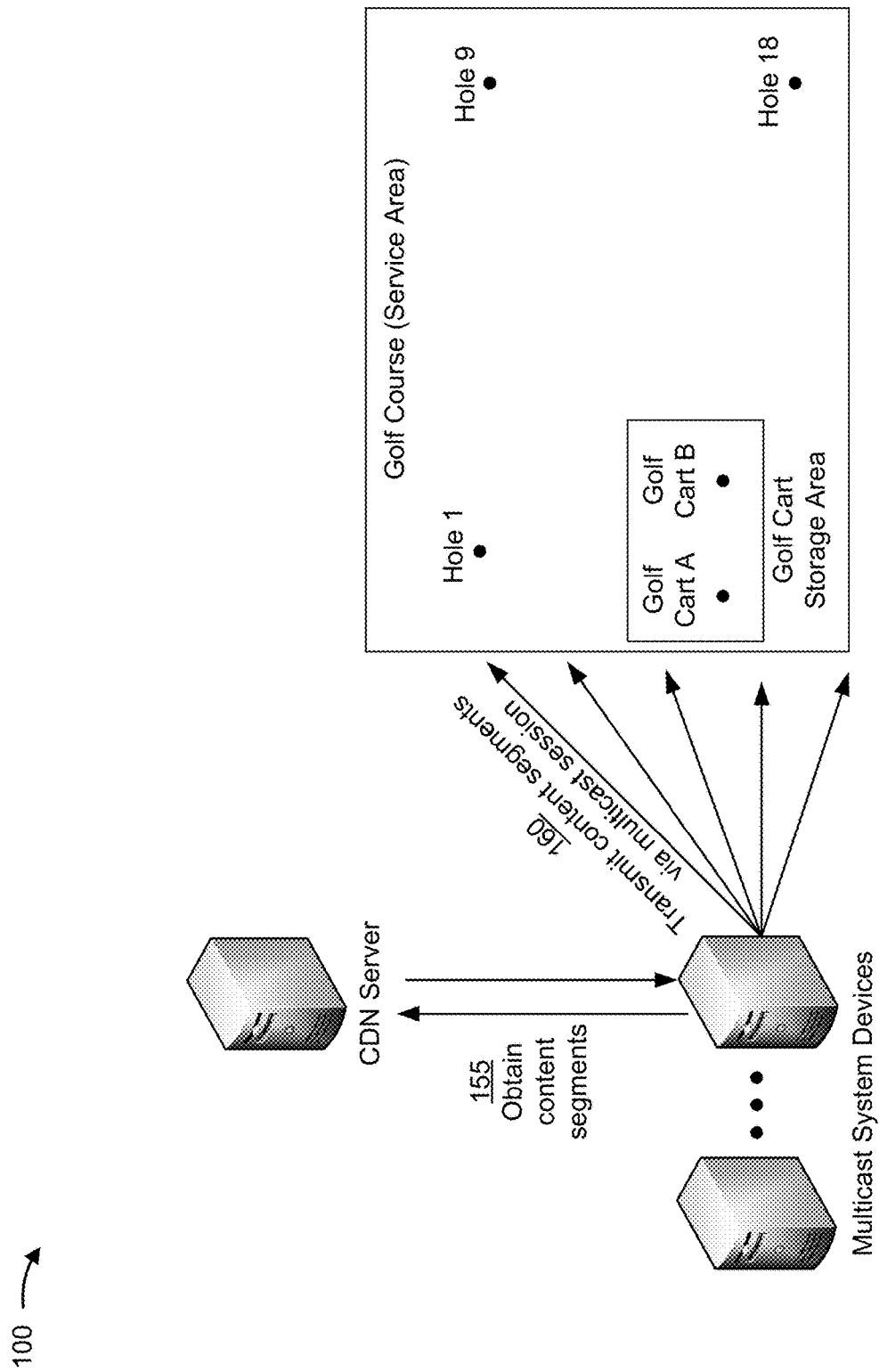

As shown in FIG. 1E, and by reference number 155, the multicast system can obtain the set of content segments from the CDN server. For example, at the scheduled multicast session time, the multicast system can obtain the set of content segments using a URL included in the multicast session instructions.

As shown by reference number 160, the multicast system can generate a multicast session (e.g., a download session) to transmit the set of content segments to a service area (e.g., a golf course). For example, the one or more multicast system devices can transmit the set of content segments to a service area to allow the set of user devices (e.g., tablet devices used within golf carts) to use the multicast session to receive one or more of the content segments.

As an example, a gas-powered golf cart (e.g., shown as golf cart A) and an electric-powered golf cart (shown as golf cart B) can park in a golf cart storage area, and can use the multicast session to receive one or more of the content segments. In this case, the electric-powered golf cart can remain powered on in the storage area for a longer time period than the gas-powered golf cart, effectively allowing a user device associated with the electric-powered golf cart to obtain the full 3 GB of content while a user device associated with the gas-powered golf cart might only obtain one content segment (e.g., 1 GB of content).

Additionally, the set of user devices can store one or more content segments. For example, a user device can store a content segment (e.g., using cache memory, flash memory, etc.), and can store the content segment for a fixed time period (e.g., before removing the content from the user device).

In this way, the set of user devices receive and store one or more content segments to provide golfers with offline access to the content while golfing.

Figure 1F:
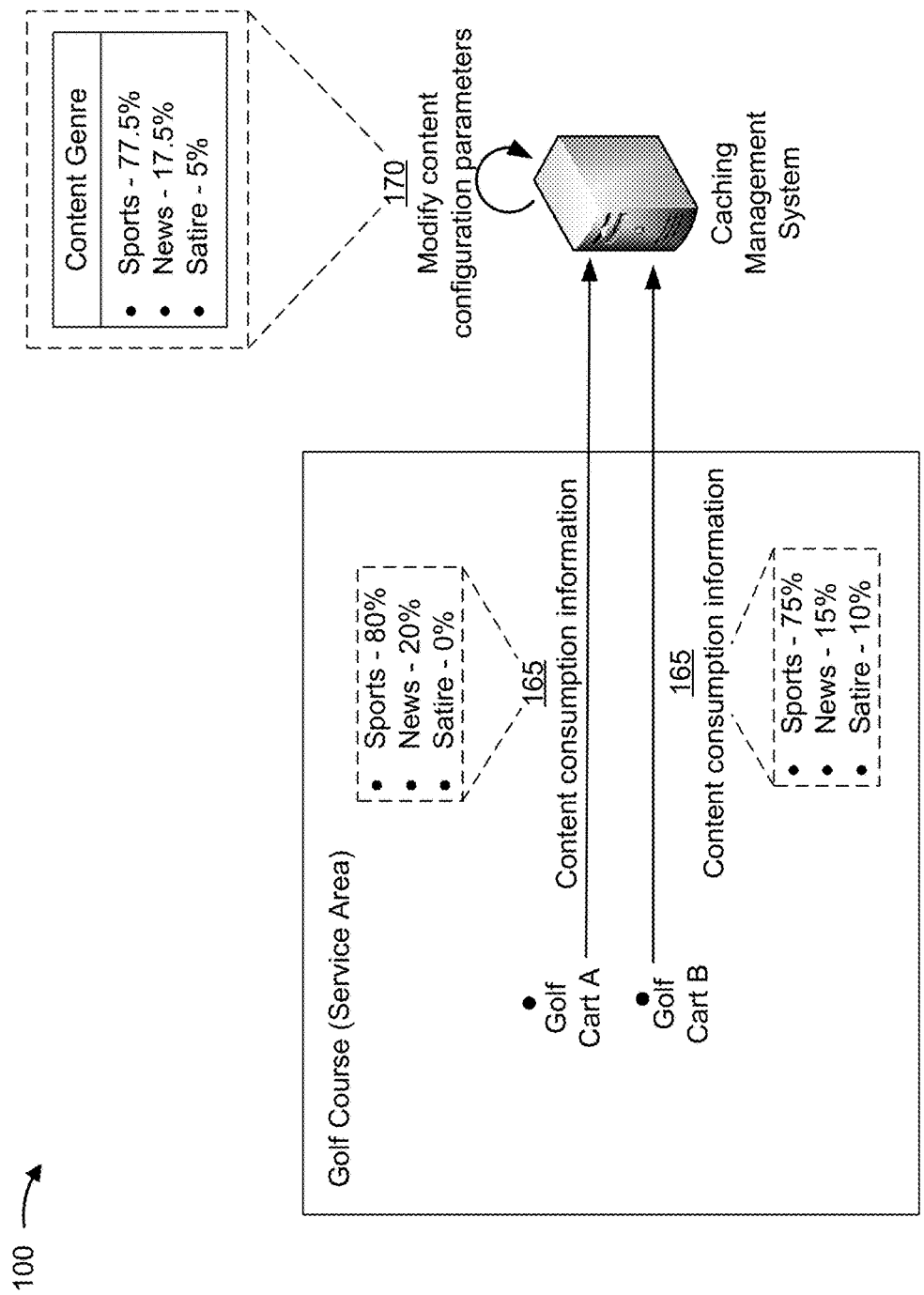

As shown in FIG. 1F, and by reference number 165, the set of user devices can provide content consumption information to the caching management system. For example, users can access content (e.g., while golfing), and an application local to the user devices can generate and store content consumption information associated with data use. The content consumption information can include information indicating an amount of data use (e.g., per file, per genre, overall, etc.), information indicating a duration of data use (e.g., per file, overall, per advertisement, etc.), and/or the like.

Shown as an example, assume a user within golf cart A accesses content using a first user device, where 80% of the content consumed is sports content and 20% of the content consumed is news content. Additionally, assume a user within golf cart B accesses content using a second user device, where 75% of the content consumed is sports content, 15% of the content consumed is news content, and 10% of the content consumed is satirical content. In this case, the first user device and the second user device can provide content consumption information to the caching management system for further processing.

As shown by reference number 170, the caching management system can modify one or more content configuration parameters. For example, the caching management system can analyze the content consumption information to determine one or more user preference metrics (e.g., an average distribution of content genres), and can modify a content configuration parameter if the content configuration parameter does not satisfy a threshold level of similarity with a user preference metric.

Shown as an example, the caching management system can analyze the content consumption information to determine an average distribution of content genres (e.g., 77% sports content, 17.5% news content, and 5% satire content), and can use the average distribution of content genre to modify the parameter indicating the amount of content per genre. In this way, the caching management system can make subsequent requests for content that more accurately represent the content needs of the users.

In this way, the caching management system can orchestrate delivery of content to a set of devices for offline consumption.

As indicated above, FIGS. 1A-1F are provided merely as an example. Other examples are possible and can differ from what was described with regard to FIGS. 1A-1F. For example, in other implementations, the caching management system can orchestrate delivery of content in a number of different contexts, such as by orchestrating delivery of content to devices within a bus, a taxi, an airplane, a boat, a stadium, a park, a shopping mall, a resort, a hotel, a college campus, a business campus, an airport, and/or the like.

Figure 2:
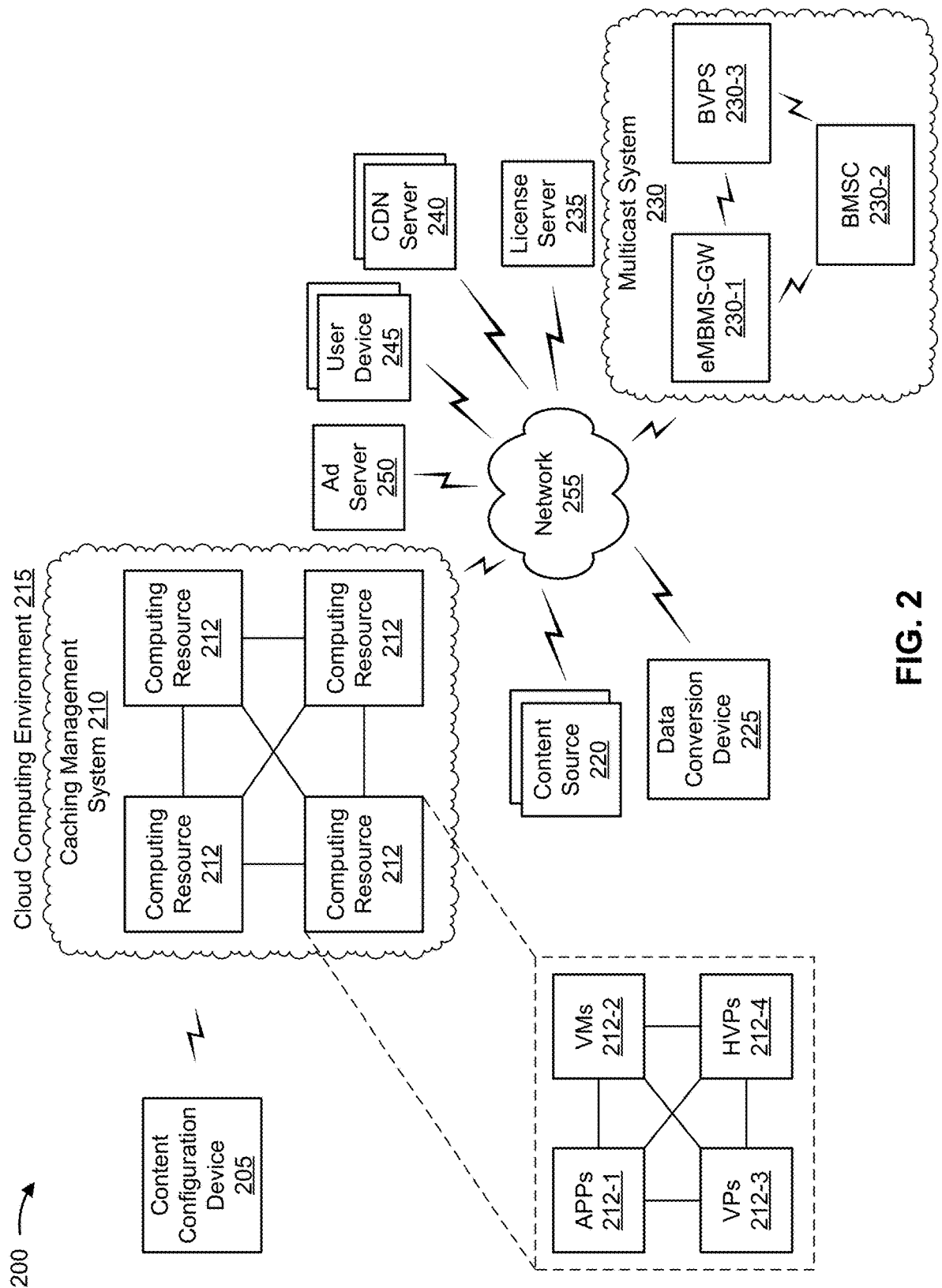
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include a content configuration device 205, a caching management system 210 hosted within a cloud computing environment 215, a content source 220, a data conversion device 225, a multicast system 230 (e.g., an evolved Multimedia Broadcast/Multicast Service Gateway (eMBMS-GW) 230-1, a Broadcast-Multicast Service Center (BMSC) 230-2, and/or a broadcast video provisioning system (BVPS) 230-3), a license server 235, a CDN server 240, a user device 245, an advertisement server 250, and/or a network 255. Devices of environment 200 can interconnect via wired connections, wireless connections, or a combination of wired and wireless connections.

Content configuration device 205 includes one or more devices capable of receiving, storing, and/or providing a request for content. For example, content configuration device 205 can include a desktop computer, a laptop computer, a tablet computer, a smart phone, a server device, and/or a similar type of device. In some implementations, content configuration device 205 can provide a set of content configuration parameters to caching management system 210. In some implementations, content configuration device 205 can be a device accessible by a network service provider. Additionally, or alternatively, content configuration device 205 can be a device accessible by a client of the network service provider (e.g., an owner of a golf course).

Caching management system 210 includes one or more devices capable of receiving, storing, converting, separating, encrypting, monitoring, modifying, and/or providing content. For example, caching management system 210 can include a server device (e.g., a host server, a web server, an application server, etc.), a data center device, or a similar device.

In some implementations, caching management system 210 can obtain content from content sources 220. In some implementations, caching management system 210 can provide content to data conversion device 225, and can receive, from data conversion device 225, content that that has been converted to a format capable of being cached. In some implementations, caching management system 210 can provide multicast session instructions to multicast system 230. In some implementations, caching management system 210 can receive content consumption information from user devices 245.

In some implementations, as shown, caching management system 210 can be hosted in cloud computing environment 215. Notably, while implementations described herein describe caching management system 210 as being hosted in cloud computing environment 215, in some implementations, caching management system 210 might not be cloud-based (i.e., can be implemented outside of a cloud computing environment) or can be partially cloud-based.

Cloud computing environment 215 includes an environment that hosts caching management system 210. Cloud computing environment 215 can provide computation, software, data access, storage, and/or other services that do not require end-user knowledge of a physical location and configuration of system(s) and/or device(s) that host caching management system 210. As shown, cloud computing environment 215 can include a group of computing resources 212 (referred to collectively as "computing resources 212" and individually as "computing resource 212").

Computing resource 212 includes one or more personal computers, workstation computers, server devices, or another type of computation and/or communication device. In some implementations, computing resource 212 can host caching management system 210. The cloud resources can include compute instances executing in computing resource 212, storage devices provided in computing resource 212, data transfer devices provided by computing resource 212, etc. In some implementations, computing resource 212 can communicate with other computing resources 212 via wired connections, wireless connections, or a combination of wired and wireless connections.

As further shown in FIG. 2, computing resource 212 can include a group of cloud resources, such as one or more applications ("APPs") 212-1, one or more virtual machines ("VMs") 212-2, virtualized storage ("VSs") 212-3, one or more hypervisors ("HYPs") 212-4, or the like.

Application 212-1 includes one or more software applications that can be provided to or accessed by content configuration device 205. Application 212-1 can eliminate a need to install and execute the software applications on content configuration device 205. For example, application 212-1 can include software associated with caching management system 210 and/or any other software capable of being provided via cloud computing environment 215. In some implementations, one application 212-1 can send/receive information to/from one or more other applications 212-1, via virtual machine 212-2.

Virtual machine 212-2 includes a software implementation of a machine (e.g., a computer) that executes programs like a physical machine. Virtual machine 212-2 can be either a system virtual machine or a process virtual machine, depending upon use and degree of correspondence to any real machine by virtual machine 212-2. A system virtual machine can provide a complete system that supports execution of a complete operating system ("OS"). A process virtual machine can execute a single program, and can support a single process. In some implementations, virtual machine 212-2 can execute on behalf of a user (e.g., content configuration device 205), and can manage infrastructure of cloud computing environment 215, such as data management, synchronization, or long-duration data transfers.

Virtualized storage 212-3 includes one or more storage systems and/or one or more devices that use virtualization techniques within the storage systems or devices of computing resource 212. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 212-4 provides hardware virtualization techniques that allow multiple operating systems (e.g., "guest operating systems") to execute concurrently on a host computer, such as computing resource 212. Hypervisor 212-4 can present a virtual operating system to the guest operating systems, and can manage the execution of the guest operating systems. Multiple instances of a variety of operating systems can share virtualized hardware resources.

Content source 220 includes one or more devices capable of receiving, storing, generating, processing, and/or providing content. For example, content source 220 can include a server device (e.g., a host server, a web server, an application server, etc.) or a similar device.

Data conversion device 225 includes one or more devices capable of receiving, storing, processing, converting, and/or providing content. For example, data conversion device 225 can include a server device (e.g., a host server, a web server, an application server, etc.) or a similar device.

Multicast system 230 includes one or more devices capable of receiving, generating, storing, processing, and/or providing information associated with a multicast service. In some implementations, multicast system 230 can include eMBMS-GW 230-1, BMSC 230-2, and/or BVPS 230-3.

eMBMS-GW 230-1 includes one or more devices capable of routing packets to a multicast session (e.g., a multicast stream, a multicast download session, etc.). For example, eMBMS-GW 230-1 can include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, eMBMS-GW 230-1 can receive traffic from network 255 and/or other network devices, and can send the received traffic to user device 245 via a base station. In some implementations, eMBMS-GW 230-1 can transmit content segments via a multicast session to a service area.

BMSC 230-2 includes one or more devices capable of receiving, generating, storing, processing, and/or providing information associated with a multicast service. For example, BMSC 230-2 can include a server device, a traffic transfer device (e.g., a router, a switch, a hub, etc.), or a similar device. In some implementations, BMSC 230-2 can allocate bandwidth for providing a multicast service, and/or can instruct other devices associated with providing the multicast service.

BVPS 230-3 includes one or more devices capable of receiving, generating, storing, processing, and/or providing information associated with providing a multicast service. For example, BVPS 230-3 can include a server device, a traffic transfer device (e.g., a router, a switch, a hub, etc.), or a similar device. In some implementations, BVPS 230-3 can provision an eMBMS. In some implementations, BVPS 230-3 can create multicast services. In some implementations, BVPS 230-3 can use multicast session instructions to obtain content segments from CDN server 240.

License server 235 includes one or more devices capable of validating content. For example, license server 235 can include a server device (e.g., a host server, a web server, an application server, etc.) or a similar device. In some implementations, license server 235 can receive a key from caching management system 210. In some implementations, license server 235 can receive a request from user device 245 to access content. In this case, license server 235 can validate the request and provide user device 245 with the key to allow user device 245 to access the content.

CDN server 240 includes one or more devices capable of receiving, storing, processing, and/or providing information associated with content. For example, CDN server 240 can include a server device (e.g., a host server, a web server, an application server, etc.) or a similar device. In some implementations, CDN server 240 can receive content from caching management system 210, can store the content, and can provide the content to BVPS 230-3.

User device 245 includes one or more devices capable of receiving, generating, storing, processing, and/or providing information associated with content. For example, user device 245 can include a computing device, such as a mobile phone (e.g., a smart phone, a radiotelephone, etc.), a laptop computer, a tablet computer, a handheld computer, a wearable communication device (e.g., a smart wristwatch, a pair of smart eyeglasses, etc.), or a similar type of device. In some implementations, user device 245 can obtain content segments via a multicast session (e.g., a download session) provided by multicast system 230.

Advertisement server 250 includes one or more devices capable of receiving, storing, processing, and/or providing information associated with advertisements. For example, advertisement server 250 can include a server device (e.g., a host server, a web server, an application server, etc.) or a similar device. In some implementations, advertisement server 250 can provide advertisements associated with the content. In this case, the advertisements can be included in the content, and a user accessing the content can view advertisements or skip advertisements after a threshold time period. In some implementations, advertisement server 250 can receive, from user device 245 or caching management system 210, metrics indicating an amount of users viewing the advertisements, a duration at which users viewed the metrics, and/or the like.

Network 255 includes one or more wired and/or wireless networks. For example, network 255 can include a cellular network (e.g., a fifth generation (5G) network, a fourth generation (4G) network, such as a long term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
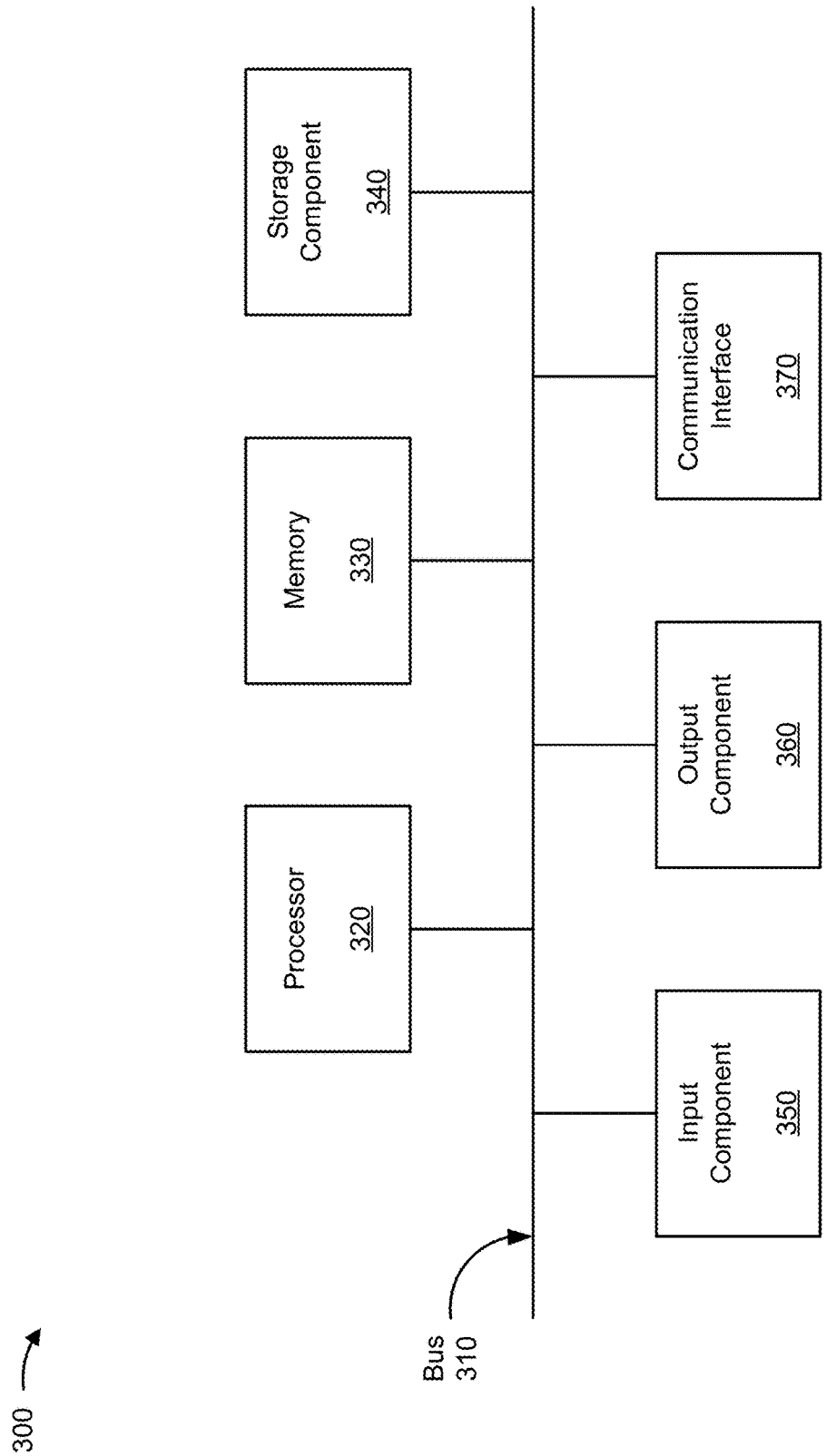
FIG. 3 is a diagram of example components of one or more devices of FIG. 2.

FIG. 3 is a diagram of example components of a device 300. Device 300 can correspond to caching management system 210. In some implementations, content configuration device 205, content source 220, data conversion device 225, multicast system 230 (e.g., eMBMS-GW 230-1, BMSC 230-2, and/or BVPS 230-3), license server 235, CDN server 240, user device 245, and/or advertisement server 250 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a Wi-Fi interface, a cellular network interface, or the like.

Device 300 can perform one or more processes described herein. Device 300 can perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
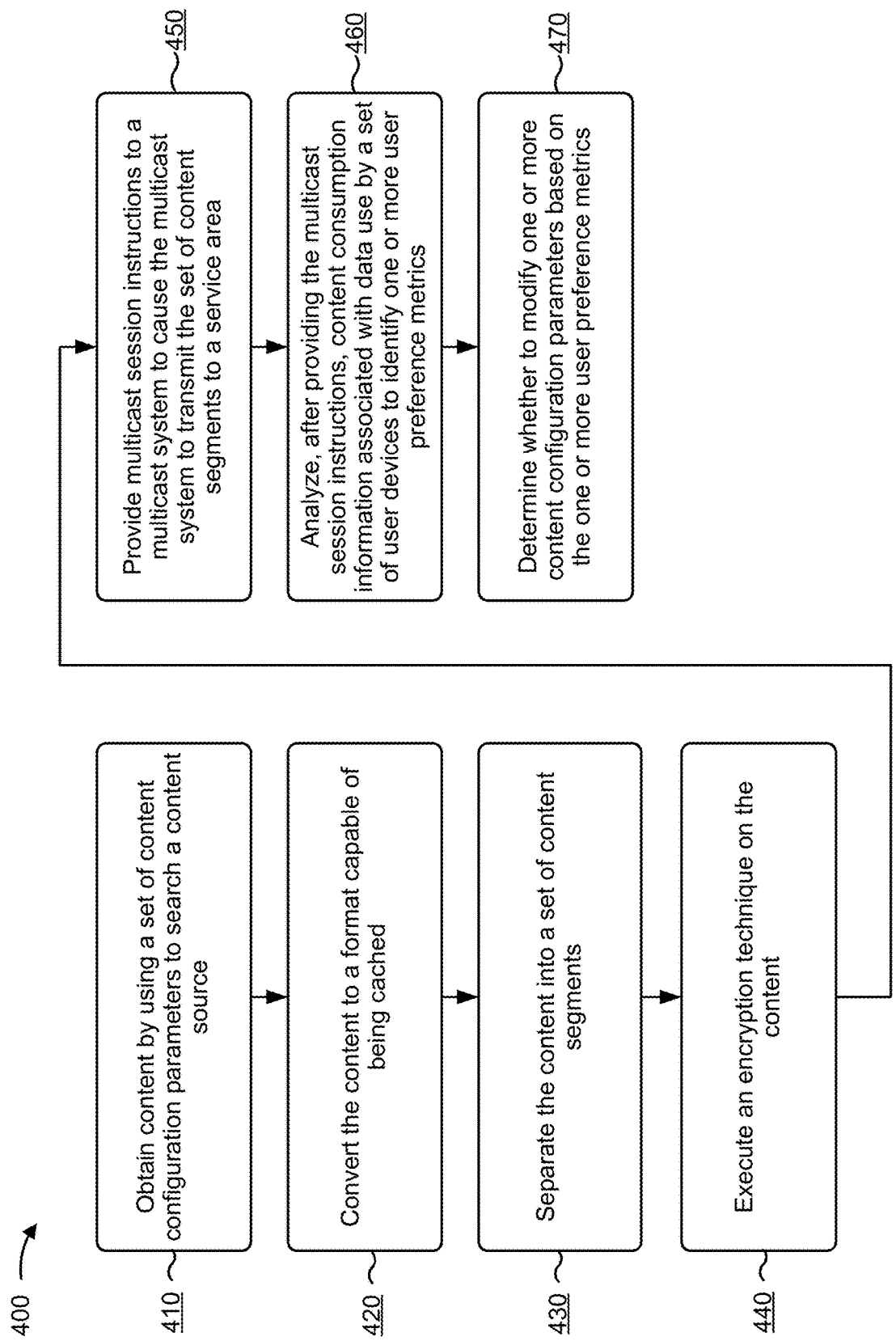
FIG. 4 is a flow chart of an example process for automatically delivering content to a set of user devices for offline consumption.

FIG. 4 is a flow chart of an example process 400 for automatically delivering content to a set of user devices for offline consumption. In some implementations, one or more process blocks of FIG. 4 can be performed by caching management system 210. In some implementations, one or more process blocks of FIG. 4 can be performed by another device or a group of devices separate from or including caching management system 210, such as content configuration device 205, content source 220, data conversion device 225, multicast system 230 (e.g., eMBMS-GW 230-1, BMSC 230-2, and/or BVPS 230-3), license server 235, CDN server 240, user device 245, and/or advertisement server 250.

As shown in FIG. 4, process 400 can include obtaining content by using a set of content configuration parameters to search a content source (block 410). For example, caching management system 210 can receive a request to provide content to a set of user devices 245 in a service area, and can use a set of content configuration parameters included in the request to obtain content from content source 220. Content can include a video file, an audio file, an image file, a text file, a multimedia file, and/or the like.

In some implementations, caching management system 210 can receive a request to provide content to a set of user devices 245 in a service area. For example, a user can interact with a user interface of content configuration device 205 to input a set of content configuration parameters, which can cause content configuration device 205 to send the set of content configuration parameters to caching management system 210. Additionally, or alternatively, a user can interact with a user interface of caching management system 210.

In some implementations, the set of content configuration parameters can identify content requirements for the requested content. For example, the set of configuration parameters can include a parameter indicating an amount of content (e.g., a total amount of content, an amount of content per content provider, an amount of content per genre, etc.), a parameter indicating a frequency at which to provide content, a parameter indicating a duration of content (e.g., a maximum or minimum run-time of a file, an amount of time a file is to be stored on a user device 245, etc.), a parameter indicating a geographic location of a service area targeted for content, a parameter indicating a content segment size (e.g., as described herein, content can be logically separated into content segments), and/or the like.

In some implementations, caching management system 210 can obtain content. For example, caching management system 210 can search one or more media rich site summary (MRSS) feeds of content source 220 to obtain content. The content can include content metadata, such as a title, a genre name, a file size, a description, a keyword, a content provider identifier, a content provider name, a category, a rating, a uniform resource locator (URL), an activation date, an expiration date, and/or the like.

In some implementations, caching management system 210 can obtain content using a filtering technique. For example, caching management system 210 can identify parameters that can be used to determine which content to obtain (e.g., a parameter indicating an amount of content per genre, a parameter indicating a total amount of content, etc.). In this case, caching management system 210 can use a filtering technique to analyze content metadata for a set of files stored by content source 220, and the filtering technique can allow caching management system 210 to obtain content that satisfies the one or more content configuration parameters (e.g., content obtained can be the requested amount of content per genre, a total amount of content obtained can be equal to the total amount of content requested, etc.).

As an example, assume the set of configuration parameters requests 5 GB of content, where 50% of the content is sports content and 50% of the content is news content. In this case, caching management system 210 can search content metadata identifying a particular genre to identify the content as belonging to a sports genre or a news genre. Additionally, caching management system 210 can further verify the relevancy of the content by analyzing a title and/or keywords associated with the content. For example, content can have a genre of sports, but relate to a type of sport that is not relevant to the demographic of users that will be viewing the content. As such, caching management system 210 can use the filtering technique to ensure that relevant content is obtained.

In some implementations, caching management system 210 can obtain content by searching (e.g., querying) content source 220 (e.g., periodically over a set time interval). In some implementations, content source 220 can be configured to automatically send content (e.g., periodically over a set time interval without any corresponding request from caching management system 210).

In this way, caching management system 210 can obtain content that can be further processed and delivered to a set of user devices 245 for offline consumption.

As further shown in FIG. 4, process 400 can include converting the content to a format capable of being cached (block 420). For example, caching management system 210 can convert (e.g., transcode, encode, etc.) the content to a format capable of being cached or can provide a request to data conversion device 225 to convert the content.

In some implementations, caching management system 210 can convert the content. For example, caching management system 210 can convert (e.g., transcode) the content from a first state to a second state by modifying a file type, a resolution, a bit rate, and/or the like. As an example, caching management system 210 can transcode the content from a first file type, a first resolution, and a first bit rate, to a second file type, a second resolution, and a second bit rate, where a file of the second file type, second resolution, and second bit rate is capable of being cached.

In some implementations, caching management system 210 can use data conversion device 225 to transcode the content. For example, caching management system 210 can determine that a format of the content is not capable of being cached or might be difficult to cache. In this case, caching management system 210 can provide the content to data conversion device 225 (e.g., using a secure file transfer protocol (SFTP)), and data conversion device 225 can transcode the content to a format capable of being cached. Data conversion device 225 can transcode the content in the same manner described above (e.g., by modifying a file type, a resolution, a bit rate, etc.). Additionally, data conversion device 225 can provide the transcoded content to caching management system 210.

As an example, assume caching management system 210 provides data conversion device 225 with content that includes a set of media files with an HTTP live streaming (HLS) file type. In this case, data conversion device 225 can transcode the content to a file capable of being cached (e.g., an mp4 file with a resolution and bit rate that is lower than the HLS file).

In this way, caching management system 210 is able to convert the content to a format capable of being cached.

As further shown in FIG. 4, process 400 can include separating the content into a set of content segments (block 430). For example, caching management system 210 can separate the content into a set of content segments to allow user devices 245 that are unable to receive all of the content during a multicast session to receive one or more content segments that each includes a complete distribution of content indicated by the content configuration parameters (e.g., a distribution of genres, a distribution of content providers, etc.). A content segment can be a logically partitioned subset of the content.

In some implementations, caching management system 210 can separate content into a set of content segments using a segmentation technique and/or one or more of the configuration parameters. For example, the set of configuration parameters can include a configuration parameter indicating a content segment size (e.g., 500 MB, 1 GB, etc.) and a configuration parameter indicating an amount or a distribution of content per genre (e.g., 34% sports, 33% news, 33% satire, etc.). In this case, caching management system 210 can analyze content metadata associated with the content (e.g., metadata indicating a genre, a file size, etc.) to separate the content into a set of content segments.

As an example, assume caching management system 210 obtains 10 GB of content. Further assume a configuration parameter indicates that content is to be 50% sports content and 50% news content and that another configuration parameter indicates a content segment size of 1 GB. In this case, caching management system 210 can analyze content metadata to separate the content into ten 1 GB content segments, where each content segment includes 500 MB of sports content and 500 MB of news content.

By separating the content into content segments that each includes a complete distribution of content indicated by the content configuration parameters, caching management system 210 allows user devices 245 to receive content that includes a full range of genres, even if user devices 245 are unable to receive all of the content during a multicast session.

As further shown in FIG. 4, process 400 can include executing an encryption technique on the content (block 440). For example, caching management system 210 can execute an encryption technique on the content to ensure that only user devices 245 with a license are able to access the content, thereby increasing security of the content delivery system.

In some implementations, caching management system 210 can execute an encryption technique on the content. For example, caching management system 210 can encrypt each file associated with the content by converting each file to cipher code. In this case, caching management system 210 can establish an association between the content data and a key associated with data decryption (e.g., by compressing the content with the key), and can provide a copy of the key to license server 235. Additionally, as described further herein, user devices 245 that have a license to access the content can interact with license server 235 to obtain the key (e.g., which can be used to decrypt and access the content).

In some implementations, as described above, caching management system 210 can associate the content data with a key (e.g., by compressing the content with the key). In some implementations, caching management system 210 can associate each content segment with a unique key (e.g., by compressing each content segment with each unique key). This further increases security of the content delivery system.

By executing an encryption technique on the content, caching management system 210 ensures that only user devices 245 with a license can access the content.

As further shown in FIG. 4, process 400 can include providing multicast session instructions to a multicast system to cause the multicast system to transmit the set of content segments to a service area (block 450). For example, caching management system 210 can provide the set of content segments to CDN server 240, and can provide multicast session instructions to multicast system 230 (e.g., to BVPS 230-3). In this case, multicast system 230 can search (e.g., query) CDN server 240 to obtain the set of content segments, and can transmit the set of content segments to a service area via a multicast session.

In some implementations, caching management system 210 can provide the set of content segments to CDN server 240. For example, caching management system 210 can provide the set of content segments to a CDN server 240 that is in a close geographic proximity of the service area (e.g., relative to other CDN servers 240).

In some implementations, caching management system 210 can provide multicast session instructions to multicast system 230 (e.g., BVPS 230-3). For example, the multicast session instructions can include an instruction indicating a time at which to transmit the set of content segments, a transmission location (e.g., a particular service area, such as a golf course), a location at which the set of content segments are stored (e.g., a URL associated with a storage location of CDN server 240), and/or the like.

In some implementations, multicast system 230 (e.g., eMBMS-GW 230-1) can transmit the set of content segments to a service area. For example, at the scheduled multicast session time, a first device in multicast system 230 (e.g., BVPS 230-3) can obtain the set of content segments using a uniform resource locator (URL) included in the multicast session instructions. In this case, the first device in multicast system 230 can provide the set of content segments to a second device in multicast system 230 (e.g., eMBMS-GW 230-1), and the second device in multicast system 230 can use a multicast session to transmit the set of content segments to a service area.

In some implementations, a set of user devices 245 can receive one or more content segments via the multicast session. For example, assume the set of user devices 245 are located in the service area and have access to a network (e.g., the Internet). In this case, the set of user devices 245 can receive one or more content segments via the multicast session, and the set of user devices 245 can store the one or more content segments in memory (e.g., using cache memory, using flash memory, using random access memory (RAM), etc.). In this way, the multicast session can be used by the set of user devices 245 to store one or more content segments.

In this way, caching management system 210 is able to provide multicast session instructions to a multicast device to allow a set of user devices 245 to receive and store the content for offline consumption.

As further shown in FIG. 4, process 400 can include analyzing, after providing the multicast session instructions, content consumption information associated with data use of the set of user devices to identify one or more user preference metrics (block 460). For example, caching management system 210 can receive, from the set of user devices 245, content consumption information associated with offline data use. In this case, caching management system 210 can analyze the content consumption information to identify one or more user preference metrics. The content consumption information can include information indicating an amount of data use (e.g., overall, per genre, per content provider, etc.), information indicating a duration of data use (e.g., a total duration of data use, a duration of data use for particular content or a particular advertisement, etc.), and/or the like.

In some implementations, prior to user device 245 generating content consumption information, user device 245 can decrypt the content. For example, a user can interact with a user interface of user device 245 to select content from the one or more content segments. In this case, when a user selects content, user device 245 can provide a license key to license server 235, which can cause license server 235 to provide user device 245 with a key that can be used to decrypt the content. Alternatively, a user device 245 can obtain the decryption key (e.g., daily, weekly, etc.) prior to a user accessing the content, which can allow user device 245 to access the content without needing to access a network to obtain a key for decrypting the content.

In some implementations, user device 245 can generate content consumption information when a user accesses the content. For example, as content is consumed, an application local to user device 245 can generate content consumption information associated with the data use.

In some implementations, caching management system 210 can receive content consumption information. For example, assume user device 245 consumes content. In this case, user device 245 can generate content consumption information, and can provide the content consumption information to caching management system 210. If user device 245 is consuming content offline, user device 245 can store the content consumption information until a network connection is available.

In some implementations, caching management system 210 can analyze the content consumption information to identify one or more user preference metrics. For example, caching management system 210 can analyze content consumption information to determine one or more user preference metrics, such as an average amount of data use, an average duration of data use, and/or the like.

Additionally, or alternatively, user device 245 can collect and store survey information associated with data use. For example, a user interface of user device 245 can prompt a user to take a survey to indicate preferred content types and related information. In this case, user device 245 can provide the survey information to caching management system 210 in the same manner described above.

As further shown in FIG. 4, process 400 can include determining whether to modify one or more content configuration parameters based on the one or more user preference metrics (block 470). For example, caching management system 210 can modify a content configuration parameter if the content configuration parameter satisfies a threshold level of similarity with a user preference metric.

In some implementations, caching management system 210 can determine whether to modify a content configuration parameter. For example, caching management system 210 can compare a content configuration parameter and a related user preference metric. In this case, caching management system 210 can determine whether the content configuration parameter satisfies a threshold level of similarity with the related user preference metric. If the content configuration parameter satisfies the threshold level of similarity with the related user preference metric, then caching management system 210 will not modify the content configuration parameter. If the content configuration parameter does not satisfy the threshold level of similarity with the related user preference metric, then caching management system 210 can modify (e.g., increase, decrease, etc.) the content configuration parameter until the threshold level of similarity is satisfied.

In some implementations, caching management system 210 can modify a filtering technique and/or a segmentation technique. For example, assume caching management system 210 determines that a content configuration parameter satisfies a threshold level of similarity with a user preference metric. In this case, caching management system 210 can modify a filtering technique and/or a segmentation technique to allow subsequent content to more accurately represent user needs.

In some implementations, caching management system 210 can modify a content configuration parameter for a first service area using content consumption information associated with one or more additional service areas. For example, assume caching management system 210 receives content consumption information for one or more service areas (e.g., the first service area, the one or more additional service areas, etc.). In some cases, caching management system 210 can use the content consumption information associated with the one or more service areas to modify a content configuration parameter associated with the first service area.

In some implementations, caching management system 210 can use machine learning, natural language processing, or the like, to modify a content configuration parameter. For example, assume caching management system 210 receives a large volume of content consumption information associated with a set of service areas (e.g., megabytes, gigabytes, or terabytes, of content consumption information). In this case, caching management system 210 can use a machine learning technique, a natural language processing technique, or the like, to determine or predict a value that can be used as a content configuration parameter.

For example, caching management system 210 can train a data model, and can use the data model to predict a content configuration parameter that aligns with user needs. In this case, caching management system 210 can use historical content consumption information to train a data model. Additionally, caching management system 210 can provide, as input for the data model, content consumption information associated with users that are actively using content, which can cause the data model to output a content configuration parameter that aligns with user needs. In this way, caching management system 210 can use machine learning, natural language processing, or the like, to modify content configuration parameters.

In this way, caching management system 210 is able to deliver content that aligns with user needs.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

In this way, caching management system 210 orchestrates automated delivery of content onto a set of user devices 245. By automatically delivering content for offline consumption, caching management system 210 conserves network resources. For example, caching management system 210 conserves network resources that might otherwise be used to stream the content via a wireless network, conserves network resources that might otherwise be used by other devices of customers (e.g., a mobile device of a customer that is using a wireless network associated with caching management system 210), and/or the like.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, or the like.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
receive a request to provide content to a set of devices in a service area,
the request including a set of content configuration parameters that identify content requirements and that include a content segment size parameter and a total content size parameter;
obtain the content by using the set of content configuration parameters to search a content source;
separate the content into a set of content segments using at least the content segment size parameter of the set of content configuration parameters; and
provide multicast session instructions to a multicast system to cause the multicast system to transmit the set of content segments to the service area using a multicast session,
the multicast session to be used by the set of devices to store one or more content segments of the set of content segments to display offline at a later time.

2. The device of claim 1, where the set of content configuration parameters further include
a parameter indicating a frequency at which to provide content.

3. The device of claim 1, where the one or more processors, when obtaining the content, are to:
search the content source using a filtering technique and the set of content configuration parameters, and
obtain the content based on searching the content source with the filtering technique and the set of content configuration parameters.

4. The device of claim 1, where the one or more processors, when separating the content into the set of content segments, are to:
identify, from the set of content configuration parameters, the content segment size parameter,
identify, from the set of content configuration parameters, a parameter indicating a distribution of content genre, and
separate the content into the set of content segments based on the content segment size and the distribution of content genre.

5. The device of claim 1, where the one or more processors are further to:
provide the content to another device to cause the other device to convert the content to a format capable of being cached; and
receive, from the other device, the content that has been converted to the format capable of being cached.

6. The device of claim 1, where the one or more processors are further to:
encrypt, after obtaining the content, one or more files associated with the content;
establish an association between the content and a key; and provide a copy of the key to a server device.

7. The device of claim 1, where the one or more processors are further to:
receive, after providing the multicast session instructions and from the set of devices, content consumption information for the set of devices;
analyze the content consumption information to identify one or more user preference metrics; and
determine whether to modify one or more content configuration parameters of the set of content configuration parameters based on the one or more user preference metrics.

8. A non-transitory computer-readable medium storing instructions, the instructions comprising:
one or more instructions that, when executed by one or more processors, cause the one or more processors to:
receive a request to provide content to a set of devices in a service area,
the request including a set of content configuration parameters associated with the content and that include a content segment size parameter and a total content size parameter;
obtain the content by using the set of content configuration parameters to search a content source;
separate the content into a set of content segments using at least the content segment size parameter of the set of content configuration parameters; and
provide multicast session instructions to a multicast system to cause the multicast system to transmit the set of content segments to the service area using a multicast session,
the multicast session to be used by the set of devices to store one or more content segments of the set of content segments to display offline at a later time.

9. The non-transitory computer-readable medium of claim 8, where the one or more instructions, that cause the one or more processors to obtain the content, cause the one or more processors to:
analyze, for a set of files stored by the content source, content metadata to identify one or more files that satisfy requirements included in the set of content configuration parameters,
the content metadata including at least one of:
metadata identifying a genre,
metadata identifying a file size, or
metadata identifying a content provider identifier, and
obtain the one or more files that satisfy the requirements included in the set of content configuration parameters.

10. The non-transitory computer-readable medium of claim 8, where the one or more instructions, that cause the one or more processors to separate the content into the set of content segments, cause the one or more processors to:
identify, from the set of content configuration parameters, the content segment size parameter and a parameter indicating a distribution of content genre, and
separate the content into the set of content segments based on the content segment size and the distribution of content genre,
the set of content segments each including the distribution of content genre.

11. The non-transitory computer-readable medium of claim 8, where the one or more instructions, when executed by the one or more processors, further cause the one or more processors to:
convert the content from a first state to a second state after obtaining the content, where the second state is capable of being cached and is different from the first state.

12. The non-transitory computer-readable medium of claim 8, where the one or more instructions, when executed by the one or more processors, further cause the one or more processors to:

encrypt, after obtaining the content, one or more files associated with the content;

compress the content with a key; and provide a copy of the key to a server device.

13. The non-transitory computer-readable medium of claim 8, where the one or more instructions, when executed by the one or more processors, further cause the one or more processors to:

receive, after providing the multicast session instructions and from the set of devices, content consumption information for the set of devices;

analyze the content consumption information to identify a user preference metric;

determine that a content configuration parameter satisfies a threshold level of similarity with the user preference metric; and modify the content configuration parameter of the set of content configuration parameters based on determining that the content configuration parameter satisfies the threshold level of similarity with the user preference metric.

14. A method, comprising:

receiving, by a device, a request to provide content to a set of devices in a service area, the request including a set of content configuration parameters associated with the content and that include a content segment size parameter and a total content size parameter;

obtaining, by the device, content by using the set of content configuration parameters to search a content source;

separating, by the device, the content into a set of content segments using at least the content segment size parameter of the set of content configuration parameters; and providing, by the device, multicast session instructions to a multicast system to cause the multicast system to transmit the set of content segments to the service area using a multicast session, the multicast session to be used by the set of devices to store one or more content segments of the set of content segments for display offline at a later time.

15. The method of claim 14, where obtaining the content comprises:

analyzing content metadata for a set of files stored by the content source to identify one or more files that satisfy requirements included in the set of content configuration parameters, and obtaining the one or more files that satisfy the requirements included in the set of content configuration parameters.

16. The method of claim 14, where separating the content into the set of content segments comprises:

identifying, from the set of content configuration parameters, the content segment size parameter and a parameter indicating a distribution of content genre, analyzing content metadata of the content to sort a set of files included in the content by content genre, and separating the set of files into the set of content segments based on the content segment size and the distribution of content genre, the set of content segments each including the distribution of content genre.

17. The method of claim 14, further comprising:

determining, after obtaining the content, that a format of the content is not capable of being cached;

providing the content to another device to cause the other device to convert the content to a format capable of being cached; and receiving, from the other device, the content that has been converted to the format capable of being cached.

18. The method of claim 14, further comprising:

encrypting, after obtaining the content, one or more files associated with the content;

establishing an association between the content and a key associated with data decryption; and providing a copy of the key to a server device.

19. The method of claim 18, further comprising:

receiving, after providing the multicast session instructions, from the set of devices, content consumption information for a particular device of the set of devices, the particular device to consume content by providing a license key to the server device to cause the server device to verify the license key and to provide, to the particular device, a copy of a key associated with decrypting content, the particular device to use the copy of the key to decrypt the content to consume the content;

analyzing the content consumption information to identify one or more user preference metrics; and determining to modify one or more content configuration parameters of the set of content configuration parameters based on the one or more user preference metrics.

20. The method of claim 14, further comprising:

receiving, after providing the multicast session instructions and from the set of devices, content consumption information for the set of devices;

analyzing the content consumption information to identify one or more user preference metrics; and determining to modify a filtering technique and/or a segmentation technique based on the one or more user preference metrics.

* * * * *